(12) United States Patent
Berberig et al.

(10) Patent No.: US 8,047,081 B2
(45) Date of Patent: Nov. 1, 2011

(54) FLOW MONITORING APPARATUS HAVING AN ULTRASONIC SENSOR WITH A COUPLING ADAPTER HAVING SECURING MECHANISM

(75) Inventors: Oliver Berberig, Schworstadt (DE); Andreas Berger, Therwil (CH); Patrick Oudoire, Soultz (FR); Achim Wiest, Weil am Rhein (DE)

(73) Assignee: Endress + Hauser Flowtec AG, Reinach (CH)

( * ) Notice: Subject to any disclaimer, the term of this patent is extended or adjusted under 35 U.S.C. 154(b) by 337 days.

(21) Appl. No.: 12/224,546

(22) PCT Filed: Mar. 9, 2007

(86) PCT No.: PCT/EP2007/052208
§ 371 (c)(1),
(2), (4) Date: Jan. 26, 2009

(87) PCT Pub. No.: WO2007/104708
PCT Pub. Date: Sep. 20, 2007

(65) Prior Publication Data
US 2011/0023623 A1    Feb. 3, 2011

(30) Foreign Application Priority Data

Mar. 14, 2006   (DE) .......................... 10 2006 012 114

(51) Int. Cl.
*G01F 1/66* (2006.01)
*G01R 33/20* (2006.01)
(52) U.S. Cl. ....................................... 73/861.25; 73/644
(58) Field of Classification Search ........................ None
See application file for complete search history.

(56) References Cited

U.S. PATENT DOCUMENTS

| | | | |
|---|---|---|---|
| 3,921,442 A * | 11/1975 | Soloway | 73/644 |
| 4,153,894 A * | 5/1979 | Alphonse et al. | 367/7 |
| 4,333,352 A | 6/1982 | Connery et al. | |
| 4,430,593 A * | 2/1984 | Gohlert et al. | 310/327 |
| 4,787,070 A | 11/1988 | Suzuki et al. | |
| 4,962,752 A * | 10/1990 | Reichenberger et al. | 601/4 |
| 4,977,780 A | 12/1990 | Machida et al. | |
| 5,179,862 A | 1/1993 | Lynnworth | |
| 5,351,546 A * | 10/1994 | Terhune | 73/642 |
| 5,515,733 A * | 5/1996 | Lynnworth | 73/861.27 |
| 6,276,212 B1 | 8/2001 | Cooper et al. | |

(Continued)

FOREIGN PATENT DOCUMENTS
EP           1 235 056 A2       8/2002

(Continued)

*Primary Examiner* — Harshad Patel
(74) *Attorney, Agent, or Firm* — Bacon & Thomas, PLLC

(57) ABSTRACT

An apparatus for ascertaining, and/or monitoring, volume-or mass-flow of a medium flowing through a pipeline in the direction of the longitudinal axis of the pipeline. The apparatus includes: at least one ultrasonic sensor, which radiates/receives ultrasonic measuring signals at an angle of incidence/emergence into/out-of the pipeline; and a control/evaluation unit which provides, based on the ultrasonic measuring signals, information concerning volume- and/or mass-flow of the medium through the pipeline. The ultrasonic sensor includes at least one sound-producing element, a coupling shoe and a coupling adapter. The end region of the coupling adapter facing the coupling shoe has a securement mechanism for releasable securement of the coupling adapter to the coupling shoe. The end region of the coupling adapter facing the pipeline is embodied as a function of the pipeline in such a manner that it is form-fittingly securable to the pipeline.

10 Claims, 4 Drawing Sheets

U.S. PATENT DOCUMENTS

| | | |
|---|---|---|
| 6,626,049 B1 | 9/2003 | Ao |
| 6,647,804 B1 * | 11/2003 | Deines ........................ 73/861.18 |
| 7,162,930 B2 * | 1/2007 | Hashimoto et al. ........ 73/861.25 |
| 7,624,650 B2 * | 12/2009 | Gysling et al. ............. 73/861.27 |
| 7,624,651 B2 * | 12/2009 | Fernald et al. ............. 73/861.27 |
| 2005/0139013 A1 * | 6/2005 | Hashimoto et al. ........ 73/861.27 |
| 2007/0151364 A1 * | 7/2007 | Wiest et al. ................. 73/861.27 |
| 2010/0000331 A1 * | 1/2010 | Gysling ...................... 73/861.28 |

FOREIGN PATENT DOCUMENTS

| | | |
|---|---|---|
| EP | 1 248 081 A1 | 10/2002 |

\* cited by examiner

FLOW MONITORING APPARATUS HAVING AN ULTRASONIC SENSOR WITH A COUPLING ADAPTER HAVING SECURING MECHANISM

TECHNICAL FIELD

The invention relates to a clamp-on, ultrasonic, flow measuring device for ascertaining and/or monitoring volume- or mass-flow of a medium flowing through a pipeline in the direction of the longitudinal axis of the pipeline.

BACKGROUND DISCUSSION

Such a device includes: at least one ultrasonic sensor, which radiates into, or receives from, the pipeline ultrasonic measuring signals at angles of incidence and emergence, respectively; and a control/evaluation unit, which ascertains, on the basis of the ultrasonic measuring signals, volume- and/or mass-flow of the medium through the pipeline.

Ultrasonic flow measuring devices of the above-described kind are used often in process- and automation-technology. They make possible contactless ascertainment of volume- and/or mass-flow of a medium in a pipeline. Clamp-on flow measuring devices working according to the travel-time difference method are described, for example, in EP 0 686 255 B1, U.S. Pat. No. 4,484,478, or U.S. Pat. No. 4,598,593. Also, clamp-on flow measuring devices are available from Endress + Hauser under the mark, PROSONIC FLOW.

In the travel-time difference method, the different travel-times of ultrasonic measuring signals in the direction of flow, and opposite to the direction of flow, of the medium are evaluated. From the travel-time difference of the ultrasonic measuring signals, the flow velocity, and, therewith, in the case of known diameter of the pipeline, the volume flow, e.g. volume flow rate, and, in the case of known, or measured, density of the medium, the mass flow, e.g. mass flow rate, are ascertained.

When using the Doppler principle, ultrasonic measuring signals of predetermined frequency are coupled into the flowing medium, and, upon being reflected in the medium, are evaluated. On the basis of a frequency shift arising between the inwardly radiated, ultrasonic measuring signal and the reflected, ultrasonic measuring signal, then the flow velocity of the medium, or the volume- and/or mass-flow, can be ascertained.

Use of flow measuring devices working according to the Doppler principle is only possible, when air bubbles or impurities are present in the liquid medium, so that the ultrasonic measuring signals can be reflected thereon. Thus, use of such ultrasonic flow measuring devices is quite strongly limited, in comparison to ultrasonic flow measuring devices working e.g. according to the travel-time difference principle.

In the case of ultrasonic flow measuring devices working according to the travel-time difference method, the Doppler method, or the cross correlation method, the ultrasonic measuring signals are coupled at a predetermined angle into and out of the pipeline, or measuring tube, in which the flowing medium is located. In order to achieve an optimal impedance matching and, therewith, optimal in- and out-coupling, the ultrasonic measuring signals are coupled into and out of the pipeline or measuring tube via a coupling shoe, or coupling wedge. Principle component of an ultrasonic sensor is at least one piezoelectric element, which produces and/or receives the ultrasonic measuring signals in a defined frequency range.

The ultrasonic measuring signals produced in a piezoelectric element are guided via a coupling wedge, or coupling shoe, and via the tube, or pipe, wall, into the fluid medium. The medium is either a liquid or a gas. Since velocity of sound varies relatively strongly from medium to medium, refraction of the ultrasonic measuring signals is experienced at the interface between two different media. The particular angle of refraction can be calculated from Snell's law, according to which the angle of refraction depends on the ratio of the propagation velocities of the two, mutually bordering media.

In- and out-coupling of the ultrasonic measuring signals is especially problematic, when the pipeline is manufactured of metal and a gaseous medium is flowing in the pipeline. Since the acoustic impedance of a metal and a gas usually differ by an order of magnitude, a large part of the ultrasonic measuring signals are reflected back at the interface, both in the case of the in-coupling and in the case of the out-coupling. The back-reflected fraction is so large, that no reliable flow measurement is possible with a conventional ultrasonic sensor. If, then, yet other sources of error arise, which relate, for example, to the installation and mounting or to changes of environmental conditions, then a conventional ultrasonic flow measuring device is unsuitable for the particular application.

Clamp-on ultrasonic sensors for ultrasonic flow measuring devices require, for the in- and out-coupling of the ultrasonic measuring signals, a direct contact with the pipeline. Especially, no additional interface of gas, or air, must be located between the ultrasonic sensor and the pipeline. The in/out coupled power is, at comparable power density, greater, the greater the contact surface between the ultrasonic sensor and the pipeline. For improving the efficiency of in- or out-coupled power transmission, it is known to match the contact surface of the ultrasonic sensor to the surface of the pipeline, or to provide paste, or plastic, coupling media between the ultrasonic sensor and the pipeline. Solutions involving suitable plastic films placed between the ultrasonic sensor and the pipeline likewise belong to the state of the art.

As already mentioned, in the case of pipelines having smaller nominal diameters, or small outer diameters, only a fraction of the ultrasonic measuring signals available for in- or out-coupling are actually in- or out-coupled, when the contact surface between ultrasonic sensor and pipeline is flat. If a curved contact surface matched to the pipeline is used, then the ultrasonic measuring signals are, it is true, in- and out-coupled with a higher efficiency, but then the ultrasonic sensor is, because of the special design, only optimally fitted for the particular nominal diameter, or particular outer diameter, of the pipeline. This means that, for each nominal diameter, or each outer diameter, of pipeline, a specially fitted ultrasonic sensor must be constructed.

SUMMARY OF THE INVENTION

An object of the invention is to provide a cost-effective, efficient, clamp-on, flow measuring device, which is simple to mount on a pipeline.

The object is achieved by a clamp-on flow measuring device having at least one ultrasonic sensor including the following components: at least one sound-producing element; a coupling shoe; and a coupling adapter. The end region of the coupling adapter facing the coupling shoe includes a securement mechanism for releasable securement of the coupling adapter to the coupling shoe and the coupling adapter is so embodied as a function of pipeline that the coupling adapter is securable shape-fittingly to the pipeline.

Preferably, the securement mechanism is a snapping/plug-in mechanism. Such mechanisms permit an easy mounting of the coupling adapter to the coupling shoe. Of course, also any other usual type of securement is applicable in connection with the solution of the invention. For example, it is possible to screw the coupling adapter to the coupling shoe.

Especially, it is provided that, when two ultrasonic sensors are being used, the coupling adapter is so embodied that the two ultrasonic sensors are secured to their respective coupling adapters at a defined separation relative to one another.

In an advantageous further development of the apparatus of the invention, there is provided between the coupling shoe and the coupling adapter a first layer of a coupling medium. Beyond that, an option is to arrange a second layer of coupling medium between the coupling adapter and the pipeline. The two layers serve for minimizing impedance jump between mutually bordering media.

A preferred embodiment of the solution of the invention provides that the coupling adapter is composed of two elements. Both elements are, for example, so embodied as regards material selection and design, that temperature influences approximately cancel one another.

In order to assure optimal transmission of the ultrasonic measuring signals into the pipeline, the coupling adapter is embodied as a focusing lens.

There are already solutions, in which an ultrasonic sensor radiates the ultrasonic measuring signals concentratedly into the pipeline. Examples of known focusing ultrasonic sensors are set forth in U.S. Pat. No. 4,205,686 and in U.S. Pat. No. 4,184,094. In both of these known solutions, the piezoelectric element is formed concavely or convexly.

In an advantageous further development of the apparatus of the invention, coupling adapter and coupling shoe are made of the same material, or of materials having similar acoustic properties. The same holds also for the wall of the pipeline. If the pipeline is made of steel, then also the coupling shoe and the coupling adapter should be made of steel. If the pipeline is made of plastic, e.g. PAI, then the coupling adapter and the coupling shoe should be made of such plastic. If the pipeline is steel and the coupling shoe is plastic (e.g. PAI), then the coupling adapter can be made of aluminum or titanium.

Especially, the coupling adapter is so embodied as a function of the material and/or the geometry of the pipe wall, that reflection of the ultrasonic measuring signals upon in-coupling into the pipeline, or upon out-coupling out of the pipeline, is approximately zero, or minimal. In a first embodiment of the apparatus of the invention, it is provided that thickness of the coupling adapter and wall of the pipeline are so selected, that they are optimally matched to the wavelength of the ultrasonic measuring signals. In principle, the thickness of coupling adapter and tube wall depends on material—here, especially, the E-modulus, density and Poisson's ratio of the material—on wavelength, or frequency, of the ultrasonic measuring signals and on the angle of incidence/emergence, at which the ultrasonic measuring signals are radiated through the wall, into the pipeline, or out of the pipeline, as the case may be. It has been found, that thickness of the coupling adapter and wall of the pipeline should be at least three times the wavelength of the ultrasonic measuring signals. If the material is, for example, steel, with a transverse sound velocity of 3200 m/sec, and if the ultrasonic measuring signals have a wavelength of 1.6 mm, then it is preferred to make coupling adapter and the wall of the pipeline at least 4.8 mm thick. In this way, it is assured that only a minimized fraction of the ultrasonic measuring signals propagate in the wall of the pipeline. An alternative embodiment, which likewise impedes the development of transverse waves in the wall of the pipeline, provides that the coupling adapter is so embodied that attenuation of the ultrasonic measuring signals is minimized in the coupling adapter. For this, the coupling adapter and/or an attenuation layer matched to the dimensions of the pipeline are/is so embodied that sound waves arising in the wall of the pipeline are immediately attenuated. Especially, the attenuation results from penetrations or cavities in the coupling adapter or in the attenuation layer. Supplementally or alternatively, there are incorporated in the material of the coupling adapter or the attenuation layer, at least in selected regions, particles having an attenuating function. Such particles are, for example, particles of tungsten oxide. By the above-described embodiments, signal/noise ratio is improved and, thus, the measuring accuracy of the clamp-on flow measuring device is increased.

BRIEF DESCRIPTION OF THE DRAWINGS

The invention will now be explained in greater detail on the basis of the appended drawing, the figures of which show as follows.

DETAILED DISCUSSION

Figure 1:
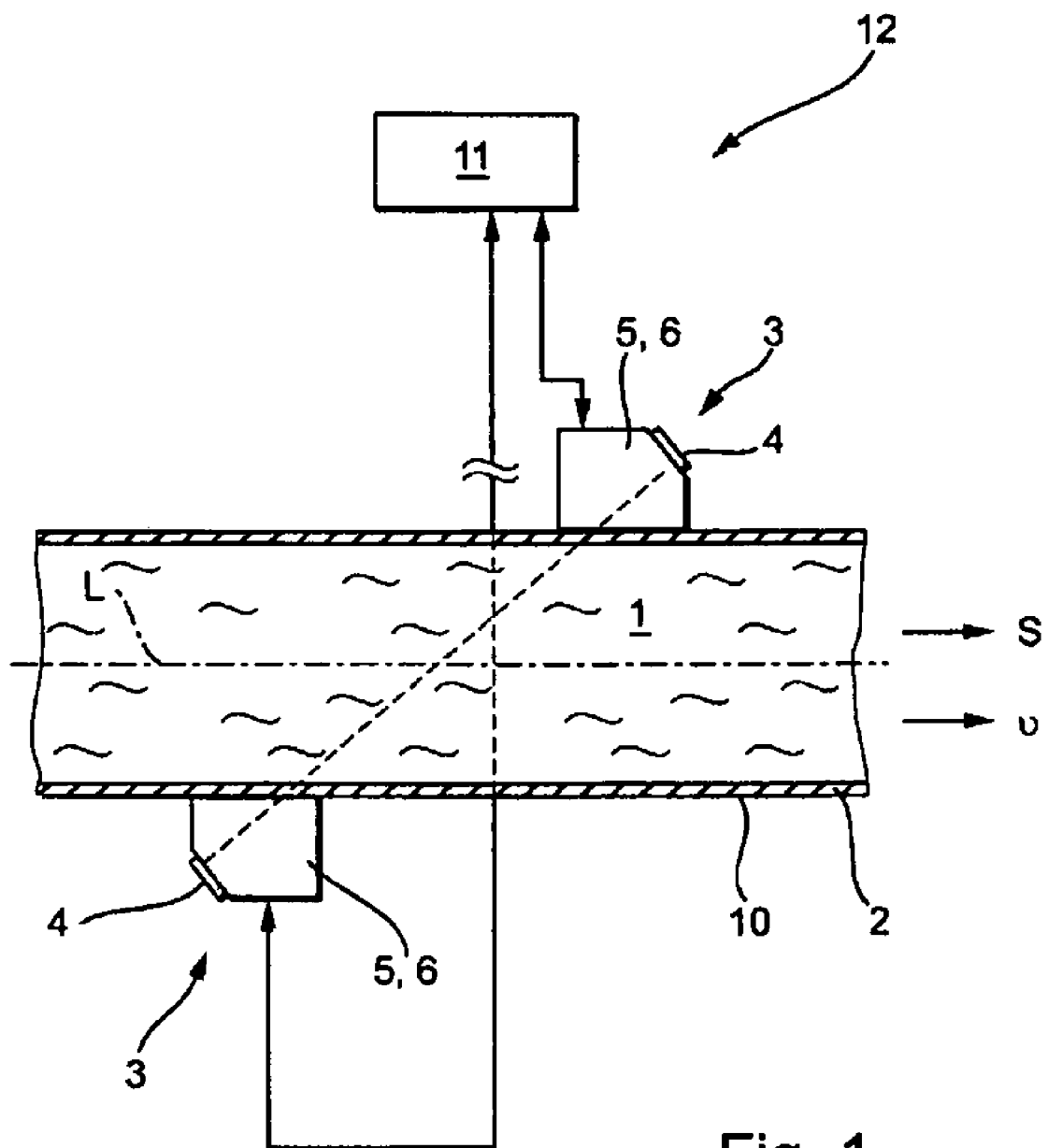
FIG. 1 schematic representation of a clamp-on flow measuring device.

FIG. 1 shows a schematic drawing of a clamp-on flow measuring device 12 of the invention with two ultrasonic sensors 3. The illustrated flow measuring device 12 ascertains volume flow, or mass flow, of the medium 1 flowing in the pipeline 2 using a sound entrainment method, especially the known travel-time difference method.

Essential components of the clamp-on ultrasonic flow measuring device 12 are the two, already mentioned, ultrasonic sensors 3 and the control/evaluation unit 11. The two ultrasonic sensors 3 are applied to the wall 10 of the pipeline 2 by means of a securement apparatus not shown specially in the figures. Appropriate securement mechanisms are sufficiently known from the state of the art and are available from, among others, the present assignee. Medium 1 flows through the pipeline 2 of inner diameter d and outer diameter D in the stream direction S with the flow velocity v.

Figure 2:
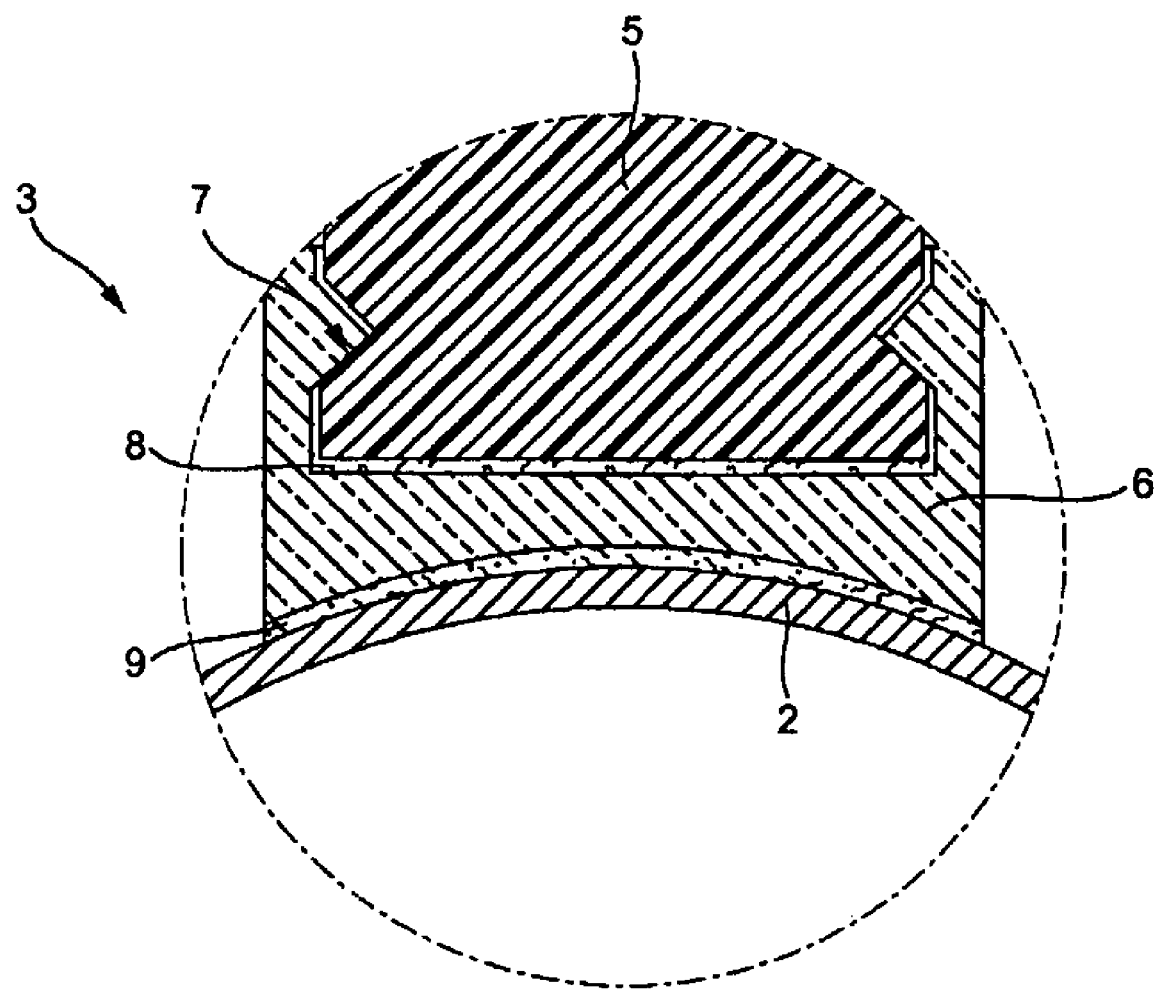
FIG. 2 schematic representation of an embodiment of an ultrasonic sensor of the invention.

The ultrasonic sensor 3 of the invention includes as an essential component, as shown in FIG. 2, at least one sound-producing element 4. Sound-producing element 4 is usually a piezoelectric element, which emits and/or receives the ultrasonic measuring signals. Additionally, ultrasonic sensor is composed of a coupling shoe 5, or coupling wedge, and a coupling adapter 6. The ultrasonic measuring signals are coupled into, and out of, the pipeline, containing the flowing medium 1, via the coupling shoe 5 and coupling adapter 6. On the basis of the travel-time difference of the ultrasonic measuring signals in the flow direction and opposite to the flow direction, the control/evaluation unit ascertains volume- and/or mass-flow of the medium 1 through the pipeline 2.

A coupling medium 8 is situated between the coupling shoe 5 and the coupling adapter 6, and a coupling medium 8 is situated between the coupling adapter 6 and the pipeline 2.

FIG. 2 shows, schematically, an ultrasonic sensor 3 of the invention secured to a pipeline 2. The ultrasonic sensor 3 is composed, as already stated, of a sound-producing element 4, a coupling shoe 5 and a coupling adapter 6. The end region of the coupling adapter facing the coupling shoe 5 includes a securement mechanism 7, which is preferably so embodied, that the coupling adapter 6 and coupling shoe 5 can be released from one another, and joined together, in simple manner. In the illustrated case, the mutually facing end regions of the coupling adapter 6 and the coupling shoe 5 are so embodied that securement is implemented via a plug-in/snapping-in assembly of the two components 5, 6. The end region of the coupling adapter 6 facing the pipeline 2 is so embodied as a function of the pipeline 2, that it is form-fittingly securable to the pipeline 2. While maintaining all other parts as they are, according to the invention, the pressing-on of a coupling adapter 6 with suitable dimensioning enables implementation of an optimal fitting of the ultrasonic sensor 3 to any diameter D of the pipeline 2. Of course, also any other type of securement, for example a screwing of the two components 5, 6 together, can be applied in connection with the apparatus of the invention.

Moreover, the fraction of the ultrasonic measuring signals coupled into the pipeline 2 or out of the pipeline 2 can be optimized by suitable choice of material. Preferably, pipeline 2, coupling adapter 6 and coupling shoe 5 are made of the same material, or of materials having very similar acoustic properties.

Figure 3:
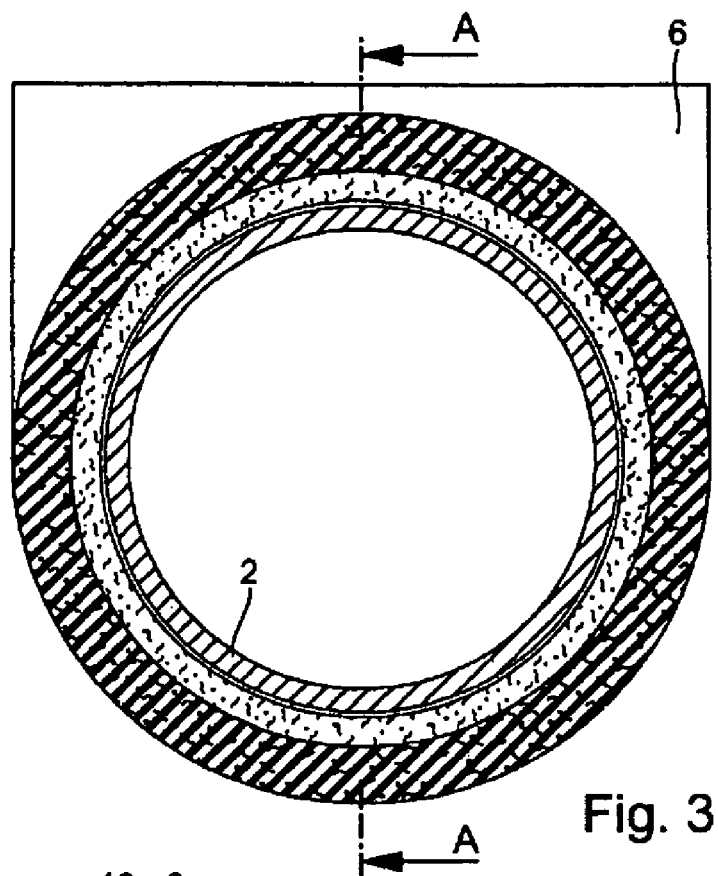
FIG. 3 cross section through an ultrasonic sensor secured to a pipeline, wherein the ultrasonic sensor is shown in a first embodiment.
Figure 3A:
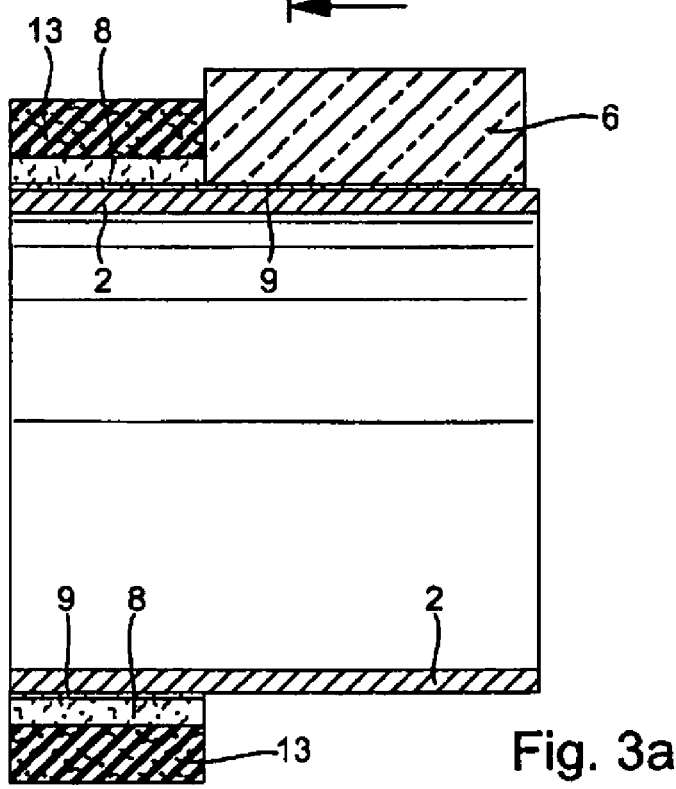
FIG. 3a view according to cutting plane A-A of FIG. 3.

Especially, the coupling adapter 6 is so embodied as a function of the material and/or the geometry of the wall 10 of the pipeline 2, that back-reflection of the ultrasonic measuring signals in the case of in-coupling into the pipeline 2, or out-coupling out of the pipeline 2, is approximately zero, or minimal. In a first embodiment of the apparatus 1 of the invention, it is provided that a matching of the thickness of coupling adapter 6 and wall 10 of the pipeline 2 to the wave length of the ultrasonic measuring signals occurs. In principle, the optimum thickness of coupling adapter 6 and wall 10 of the pipeline depends on material—here, especially, E-modulus, density and Poisson's ratio of the material—, wavelength, or frequency, of the ultrasonic measuring signals, and angle of incidence/emergence, with which the ultrasonic measuring signals are radiated through the wall 10 into, or out of, the pipeline 2. Coupling adapter 6 and wall of the pipeline 2 should have a minimum thickness at least three times the value of the wave length of the ultrasonic measuring signals. If the material is, for example, steel with a transverse sound velocity of 3200 m/sec and if the ultrasonic measuring signals have a wave length of 1.6 mm, then a thickness of coupling adapter 6 and wall 10 of the pipeline 2 of at least 4.8 mm is preferred. In this way, it is assured that the fraction of the ultrasonic measuring signals propagating in the wall 10 of the pipeline 2 is minimal. This case is illustrated in FIGS. 3 and 3a.

Figure 4:
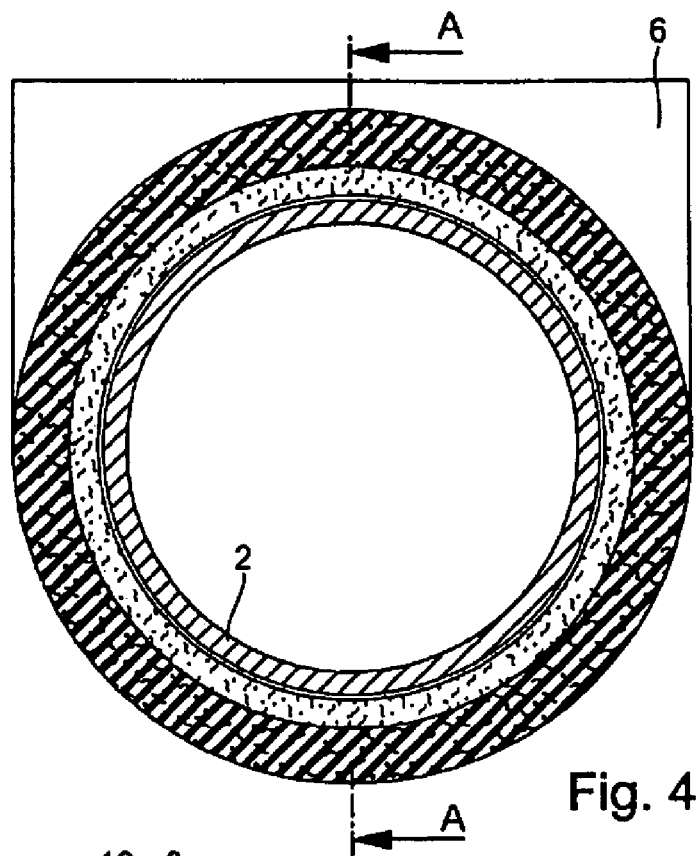
FIG. 4 cross section through an ultrasonic sensor secured to a pipeline, wherein the ultrasonic sensor is shown in a second embodiment.
Figure 4A:
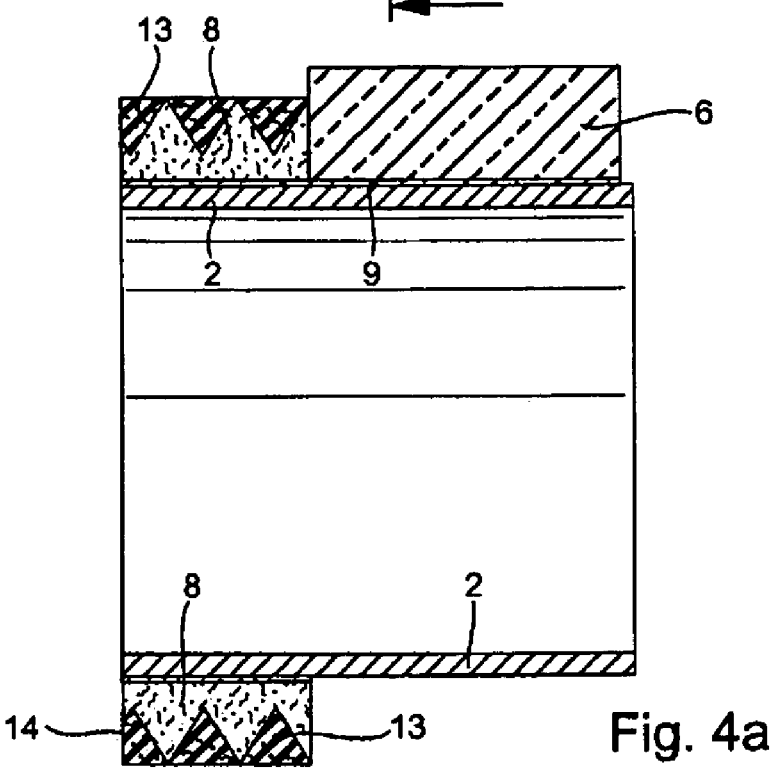
FIG. 4a view according to cutting plane A-A of FIG. 4.

An alternative embodiment, which likewise impedes development of transverse waves in the wall 10 of the pipeline 2 provides that the coupling adapter 6 is so embodied that attenuation of the ultrasonic measuring signals in the coupling adapter 6 is minimized. For this, the coupling adapter 6 and/or the attenuation layer 13 matched to the pipeline 2 are/is so embodied, that sound waves arising in the wall 10 of the pipeline 2 are strongly attenuated. Especially, the attenuation is effected by penetrations 14 in the coupling adapter 6 or in the attenuation layer 13. This case is sketched in FIGS. 4 and 4a. Supplementally or alternatively, incorporated in the material of the coupling adapter 6 or in the attenuation layer 13, at least in selected regions, are particles having an attenuating function. Such particles are, for example, particles of tungsten oxide. These are embedded in epoxide resin. By the above-described embodiments, the signal/noise ratio is improved and thus the measuring accuracy of the clamp-on flow measuring device 1 is increased.

The invention claimed is:

1. An apparatus for ascertaining and/or monitoring volume- or mass-flow of a medium flowing through a pipeline in direction of a longitudinal axis of the pipeline, comprising:
at least one ultrasonic sensor, which radiates/receives ultrasonic measuring signals at an incidence/emergence angle into/out-of the pipeline; and
a control/evaluation unit, which, on the basis of the ultrasonic measuring signals, provides information concerning volume- and/or mass-flow of the medium flowing through the pipeline, wherein:
said at least one ultrasonic sensor includes at least one sound-producing element, a coupling shoe and a coupling adapter;
an end region of said coupling adapter facing toward said coupling shoe includes a securement mechanism for releasable securement of said coupling adapter to said coupling shoe; and
an end region of said coupling adapter facing toward the pipeline is embodied as a function of the pipeline in such a manner that it is securable form-fittingly to the pipeline, and
said securement mechanism is a plug-in mechanism.

2. The apparatus as claimed in claim 1, wherein:
said coupling adapter is screwed onto said coupling shoe.

3. The apparatus as claimed in claim 1, wherein:
in a case where two ultrasonic sensors are applied, said coupling adapter is so embodied that said two ultrasonic sensors are secured to their coupling adapters at a defined separation from one another.

4. The apparatus as claimed in claim 1, further comprising:
a first layer of a coupling medium provided between said coupling shoe and said coupling adapter.

5. The apparatus as claimed in claim 1, further comprising:
a second coupling medium provided between said coupling adapter and said pipeline.

6. The apparatus as claimed in claim 1, wherein:
said coupling adapter is embodied as a focusing lens.

7. The apparatus as claimed in claim 1, wherein:
said coupling adapter and said coupling shoe are made of the same material or of materials having similar acoustic properties.

8. The apparatus as claimed in claim 1, wherein:
said coupling adapter is embodied as a function of material and/or geometry of a wall of the pipeline in such a manner that reflection of the ultrasonic measuring signals at in-coupling into the pipeline or out-coupling out of the pipeline is approximately zero, or minimal.

9. The apparatus as claimed in claim 1, wherein:
said coupling adapter is so embodied that attenuation of the ultrasonic measuring signals in said coupling adapter is minimized.

10. The apparatus as claimed in claim 1, wherein:
said the coupling adapter is so embodied and/or wherein an attenuation layer fitted to the pipeline is so embodied, that propagation of pipe waves in the wall of the pipeline is minimized.

* * * * *